United States Patent Office 3,080,728
Patented Mar. 12, 1963

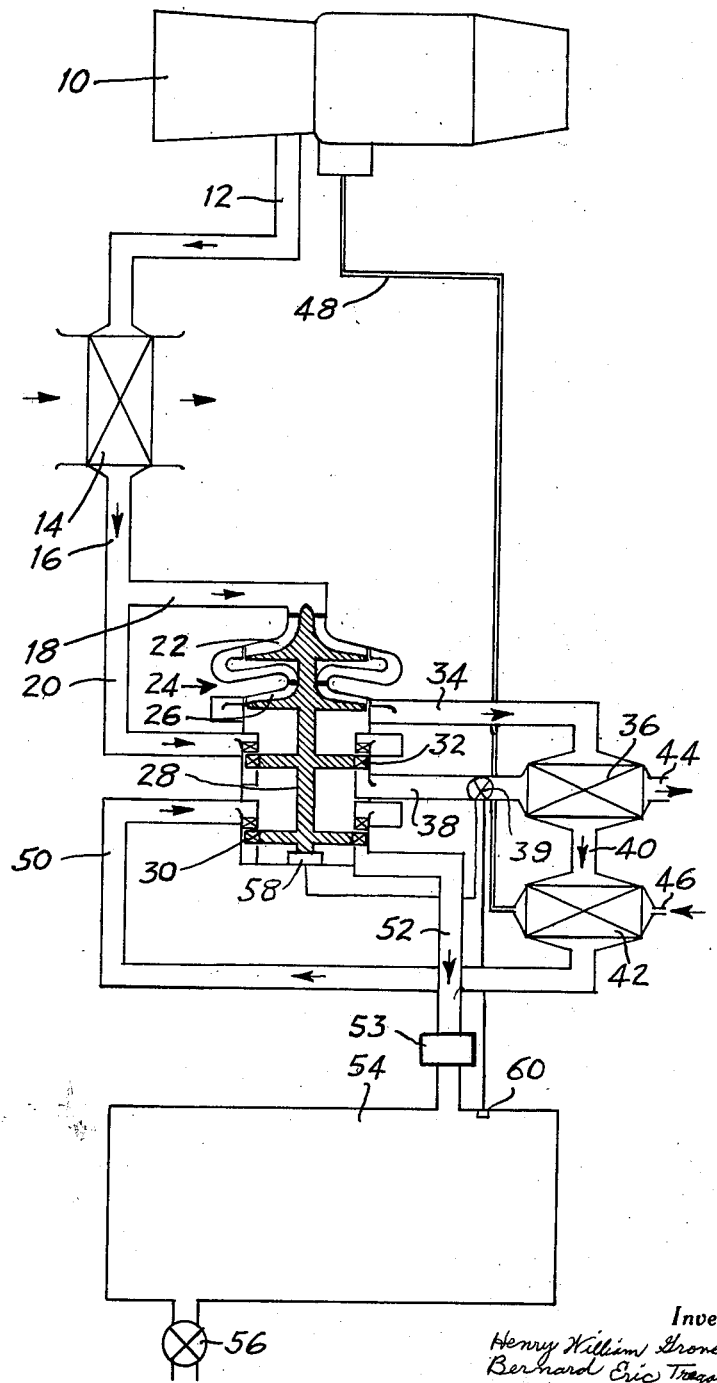

3,080,728
AIRCRAFT AIR CONDITIONING SYSTEMS
Henry W. Groves, London, and Bernard E. Treganowan, Welwyn Garden City, England, assignors to The De Havilland Aircraft Company Limited
Filed Jan. 23, 1961, Ser. No. 84,105
Claims priority, application Great Britain Jan. 26, 1960
9 Claims. (Cl. 62—172)

This invention relates to aircraft air conditioning systems.

An aircraft air conditioning system has been proposed comprising a compressor for air arranged to be driven by a first turbine and a second turbine, the compressor and second turbine having a common source of compressed air, bled from the compressor of an aircraft gas turbine engine, and air passing from the compressor to the first turbine, from which conditioned air is obtained, being cooled in a heat exchanger.

Such an arrangement, however, suffers from the necessity for very large quantities of bled air whcih has been compressed in the gas turbine engine. The invention seeks to reduce the bled air requirements and thus to enhance the efficiency of the system and reduce power loss.

One object of the invention is the provision of an aircraft air conditioning system comprising a compressor for air arranged to be driven by a first turbine and a second turbine, the compressor and second turbine having a common source of compressed air, bled from the compressor of an aircraft gas turbine engine, and air from the second turbine being arranged to flow in heat exchange relationship with air passing from the compressor to the first turbine from which conditioned air is obtained.

A further feature is the arrangement of a throttle valve between the second turbine and the heat exchanger.

Yet a further feature is that the common source air is passed in heat exchange relationship with ram air from outside the aircraft before passing to the compressor and second turbine.

The compressor may be a two stage compressor, and, conveniently there is a common shaft for the compressor and turbines.

The air from the compressor to the first turbine may also pass through additional heat exchangers before and/or after exchanging heat with air from the second turbine.

One such additional heat exchanger may be cooled by fuel for the gas turbine engine.

The invention will now be described in greater detail with reference to the accompanying diagrammatic drawing, which is a schematic diagram of a system according to the invention.

The aircraft has a propelling gas turbine engine 10, from whose compressors leads an air bleed conduit 12 to a primary heat exchanger 14 through which passes ram air during the aircraft's forward motion through the air. From the primary heat exchanger 14 leads a conduit 16 which divides into two conduits 18 and 20, the conduit 18 leading to the inlet of a compressor 22. The compressor 22 is the first stage of a two stage compressor 24 whose other stage is a compressor 26 on a common shaft 28. Also on the shaft 28 is a main or first turbine 30 and an auxiliary or second turbine 32 to whose inlet the conduit 20 leads.

The outlet of the compressor 26 is connected by a conduit 34 to a heat exchanger 36, to which the outlet of the second turbine 32 is also connected by a conduit 38. In the conduit 38 is a throttle valve 39. The conduit 34 communicates through the heat exchanger 36 with a conduit 40 leading to an additional heat exchanger 42. The conduit 38 communicates through the heat exchanger 36 with an exhaust conduit 44. A fuel feed conduit 46 communicates through the additional heat exchanger 42 with a conduit 48 and to the engine 10. The conduit 40 communicates through the heat exchanger 42 with a conduit 50 leading to the inlet of the first turbine 30. The outlet of the turbine 30 is connected by a conduit 52 through a water extractor 53 to the interior of a cabin 54 of the aircraft which has an exhaust valve 56. The throttle valve 39 is connected to a device 58 sensitive to the rotational speed of the compressor turbine unit and to a device 60 sensitive to the temperature of air in the cabin 54.

In operation, air at a high temperature and under pressure is bled from the engine 10 through the primary heat exchanger 14 in which it is cooled by the flow of ram air therethrough. The cooled air under pressure passes to the compressor 24 and turbine 32. In the compressor, the air is compressed and passes out at a high temperature and high pressure. In the turbine, the air is cooled and passes out at a low temperature and under a low pressure. The air from the compressor is then cooled in the heat exchanger 36 by the air from the second turbine and in the additional heat exchanger 42 by fuel for the engine 10. Air from the second turbine is spilled overboard through the exhaust conduit 44.

The cooled air under high pressure passes to the first turbine 30 in which it is further cooled and its pressure reduced. Cold air under reduced pressure is then passed from the outlet of the turbine 30 to the cabin 54 where it is used to condition and pressurise the cabin. The throttle valve 39 is controlled by the device 60 to give the desired air temperature in the cabin, but if the shaft 28 overspeeds, the device 58 over-rides the device 60 to control the throttle valve to reduce speed.

Fuel from the heat exchanger 42 may be recirculated back to a fuel tank (not shown) from which it is drawn. Further the additional heat exchanger may be located upstream of the heat exchanger 36. Alternatively, additional heat exchangers may be located upstream and downstream of the heat exchanger 36.

The conditioned air may be used for cooling or pressurising aircraft equipment either after leaving the cabin with the equipment in series therewith or without going through the cabin with the equipment in parallel therewith.

The arrangement of the throttle valve 39 in the conduit 38 ensures a suitable temperature control as angular displacement of the valve gives a reasonably linear variation of temperature. The pressure at the inlet to the second turbine 32 is the same as that in the conduit 18 and flow control thus occurs downstream of the turbine.

It should be understood that the present disclosure is for the purpose of illustration only and that this invention includes all modifications and equivalents which fall within the scope of the appended claims.

We claim:

1. An aircraft air conditioning system comprising the combination of an aircraft gas turbine engine having a bleed for compressed air from its compressor, a compressor for air having an inlet and outlet, a first turbine having an inlet and an outlet, a second turbine having an inlet and an outlet, a driving connection between the compressor and the turbines, an air connection from the bleed to the inlet of the compressor for air and to the inlet of the second turbine, a heat exchanger, an air connection from the outlet of the compressor for air through the heat exchanger to the inlet of the first turbine, and an air connection from the outlet of the second turbine to the heat exchanger for the flow of air from the second turbine in heat exchange relationship with air passing from the compressor to the first turbine from whose outlet conditioned air is obtained.

2. An aircraft air conditioning system comprising the combination of an aircraft gas turbine engine having a bleed for compresed air from its compressor, a compressor for air having an inlet and an outlet, a first turbine having an inlet and an outlet, a second turbine having an inlet and an outlet, a driving connection between the compressor and the turbines, an air connection from the bleed to the inlet of the compressor for air and to the inlet of the second turbine, a heat exchanger, an air connection from the outlet of the compressor for air through the heat exchanger to the inlet of the first turbine, a primary heat exchanger in the air connection from the bleed, means for supplying ram air from outside the aircraft to the primary heat exchange to flow in heat exchange relationship with bled air, and an air connection from the outlet of the second turbine to the heat exchanger for the flow of air from the second turbine in heat exchange relationship with air passing from the compressor to the first turbine from whose outlet conditioned air is obtained.

3. An aircraft air conditioning system comprising the combination of an aircraft gas turbine engine having a bleed for compressed air from its compressor, a compressor for air having an inlet and an outlet, a first turbine having an inlet and an outlet, a second turbine having an inlet and an outlet, a driving connection between the compressor and the turbines, an air connection from the bleed to the inlet of the compressor for air and to the inlet of the second turbine, a heat exchanger, an air connection from the outlet of the compressor for air through the heat exchanger to the inlet of the first turbine, an additional heat exchanger in the air connection from the outlet of the compressor for air to the inlet of the first turbine, means for the flow of fluid in heat exchange relationship with air passing from the compressor to the first turbine in the additional heat exchanger, and an air connection from the outlet of the second turbine to the heat exchanger for the flow of air from the second turbine in heat exchange relationship with air passing from the compressor to the first turbine from whose outlet conditioned air is obtained.

4. An aircraft air conditioning system as claimed in claim 3, including a fuel feed to the gas turbine engine, connected to the additional heat exchanger for the flow of fuel in heat exchange relationship with air passing from the compressor to the first turbine.

5. An aircraft air conditioning system comprising the combination of an aircraft gas turbine engine having a bleed for compressed air from its compressor, a two-stage compressor for air having an inlet and an outlet, a first turbine having an inlet and outlet, a second turbine having an inlet and an outlet, a driving connection between the two-stage compressor and the turbines, an air connection from the bleed to the inlet of the two-stage compressor and to the inlet of the second turbine, a heat exchanger, an air connection from the outlet of the two-stage compressor through the heat exchanger to the inlet of the first turbine, and an air connection from the outlet of the second turbine to the heat exchanger for the flow of air from the second turbine in heat exchange relationship with air passing from the two-stage compressor to the first turbine from whose outlet conditioned air is obtained.

6. An aircraft air conditioning system comprising the combination of an aircraft gas turbine engine having a bleed for compressed air from its compressor, a compressor for air having an inlet and an outlet, a first turbine having an inlet and an outlet, a second turbine having an inlet and an outlet, a driving connection between the compressor and the turbines, an air connection from the bleed to the inlet of the compressor for air and to the inlet of the second turbine, a heat exchanger, an air connection from the outlet of the compressor for air through the heat exchanger to the inlet of the first turbine, an air connection from the outlet of the second turbine to the heat exchanger for the flow of air from the second turbine in heat exchange relationship with air passing from the compressor to the first turbine from whose outlet conditioned air is obtained, and a throttle valve in the air connection between the outlet of the second turbine and the heat exchanger.

7. An aircraft air conditioning system comprising the combination of an aircraft gas turbine engine having a bleed for compressed air from its compressor, a compressor for air having an inlet and an outlet, a first turbine having an inlet and an outlet, a second turbine having an inlet and an outlet, a driving connection between the compressor and the turbines, an air connection from the bleed to the inlet of the compressor for air and to the inlet of the second turbine, a heat exchanger, an air connection from the outlet of the compressor for air through the heat exchanger to the inlet of the first turbine, and an air connection from the outlet of the second turbine to the heat exchanger for the flow of air from the second turbine in heat exchange relationship with air passing from the compressor to the first turbine from whose outlet conditioned air is obtained, an aircraft enclosure, an air connection from the outlet of the first turbine to the enclosure, and a throttle valve in the air connection between the outlet of the second turbine and the heat exchanger.

8. An aircraft air conditioning system as claimed in claim 7, including means responsive to temperature within the enclosure and connected to control the throttle valve.

9. An aircraft air conditioning system as claimed in claim 8, including means responsive to rotational speed of the compressor and turbines and connected to control the throttle valve to over-ride the temperature responsive means upon the occurrence of an overspeed.

References Cited in the file of this patent

UNITED STATES PATENTS

| | | |
|---|---|---|
| 2,491,461 | Wood | Dec. 13, 1949 |
| 2,585,570 | Messinger et al. | Feb. 12, 1952 |
| 2,767,561 | Seeger | Oct. 23, 1956 |
| 2,851,863 | Theed | Sept. 16, 1958 |